June 7, 1932.  E. J. BARTH  1,861,776
SHIFTING MEANS FOR TRANSMISSION MECHANISM
Filed July 11, 1928  3 Sheets-Sheet 1

INVENTOR.
Elmer J. Barth
BY Parsons & Bodell
ATTORNEYS.

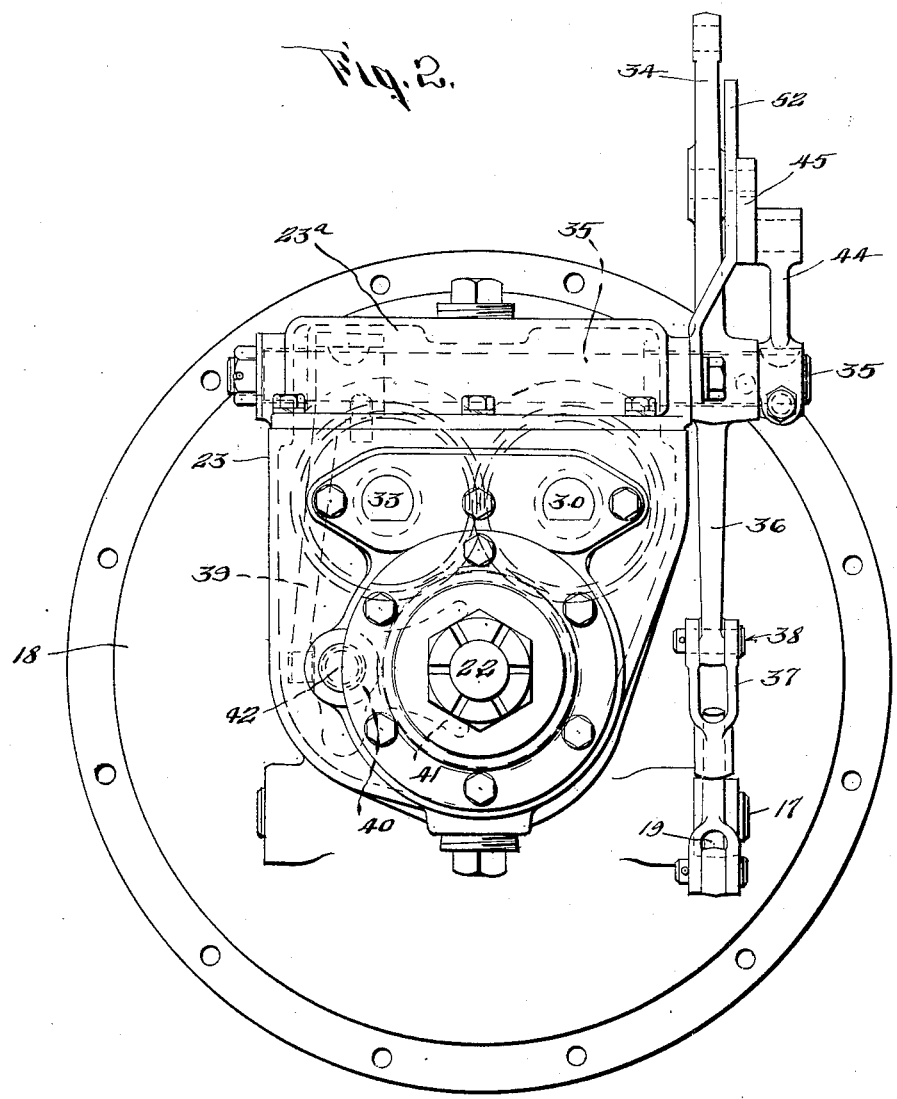

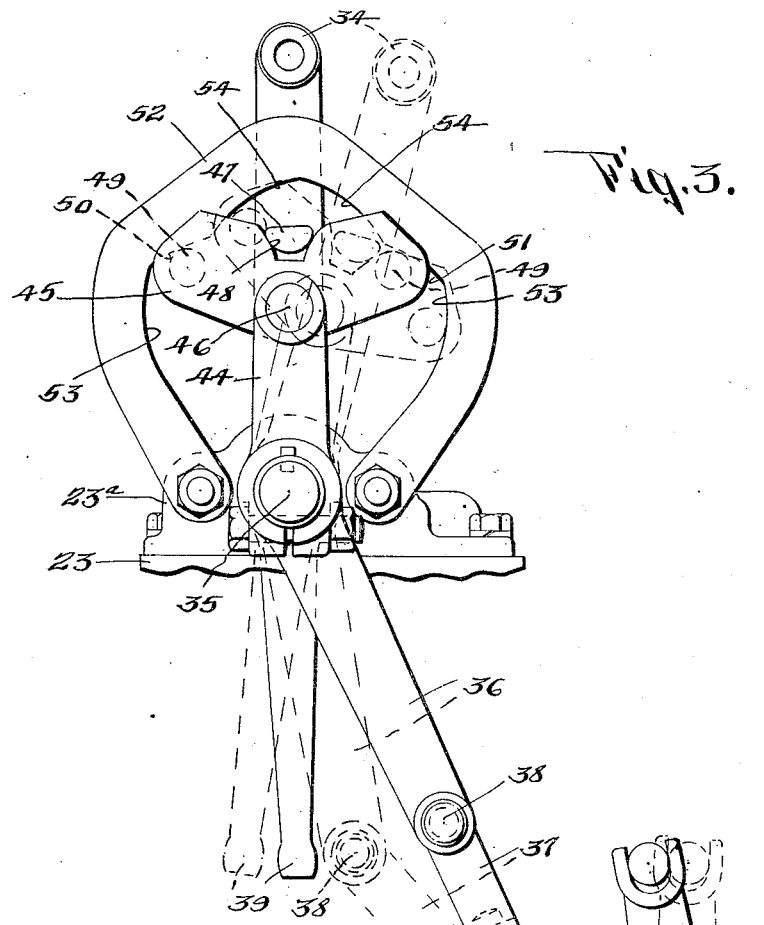
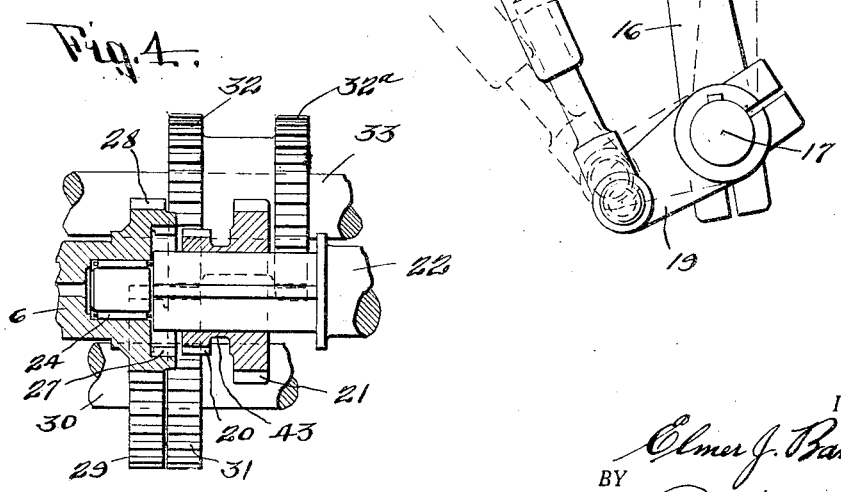

Patented June 7, 1932

1,861,776

UNITED STATES PATENT OFFICE

ELMER J. BARTH, OF SYRACUSE, NEW YORK, ASSIGNOR TO BROWN-LIPE GEAR COMPANY, OF SYRACUSE, NEW YORK, A CORPORATION OF NEW YORK

SHIFTING MEANS FOR TRANSMISSION MECHANISM

Application filed July 11, 1928. Serial No. 291,902.

This invention relates to transmission mechanism of the type wherein two elements are shifted successively as a clutch element is shiftable out of engaged position preliminary to speed or gearing changing operation and back into engaged position after the gear changing operation and particularly to a shifting or operating means which automatically throws the clutch "out" and "in" preliminary to and after gear shifting operation; and has for its object a particularly simple and efficient operating mechanism whereby the movement of the shifting member or lever from a starting position first shifts the shiftable elements of the gearing into engagement, then engages the clutch upon one continuous operation from starting position and first disengages the clutch and then the shiftable elements of the gearing upon the return movement to starting position.

It further has for its object, a gear shifting mechanism in which the operating member or lever moves in opposite directions from a neutral position to engage different speed changing elements or gears of the gearing and when moved to either side of neutral position, operates the clutch exactly the same. That is, the clutch has exactly the same in and out movement upon the operation of the operating part or lever in either direction from neutral.

The invention consists in the novel features and in the combinations and constructions hereinafter set forth and claimed.

In describing this invention, reference is had to the accompanying drawings, in which like characters designate corresponding parts in all the views.

Figure 2 is an end elevation of parts seen in Figure 1.

Figure 3 is a detail view showing the shifting mechanism in elevation.

Figure 4 is a fragmentary elevation, partly in section and parts being removed, of the gears, looking upwardly in Figure 1.

Figure 1:
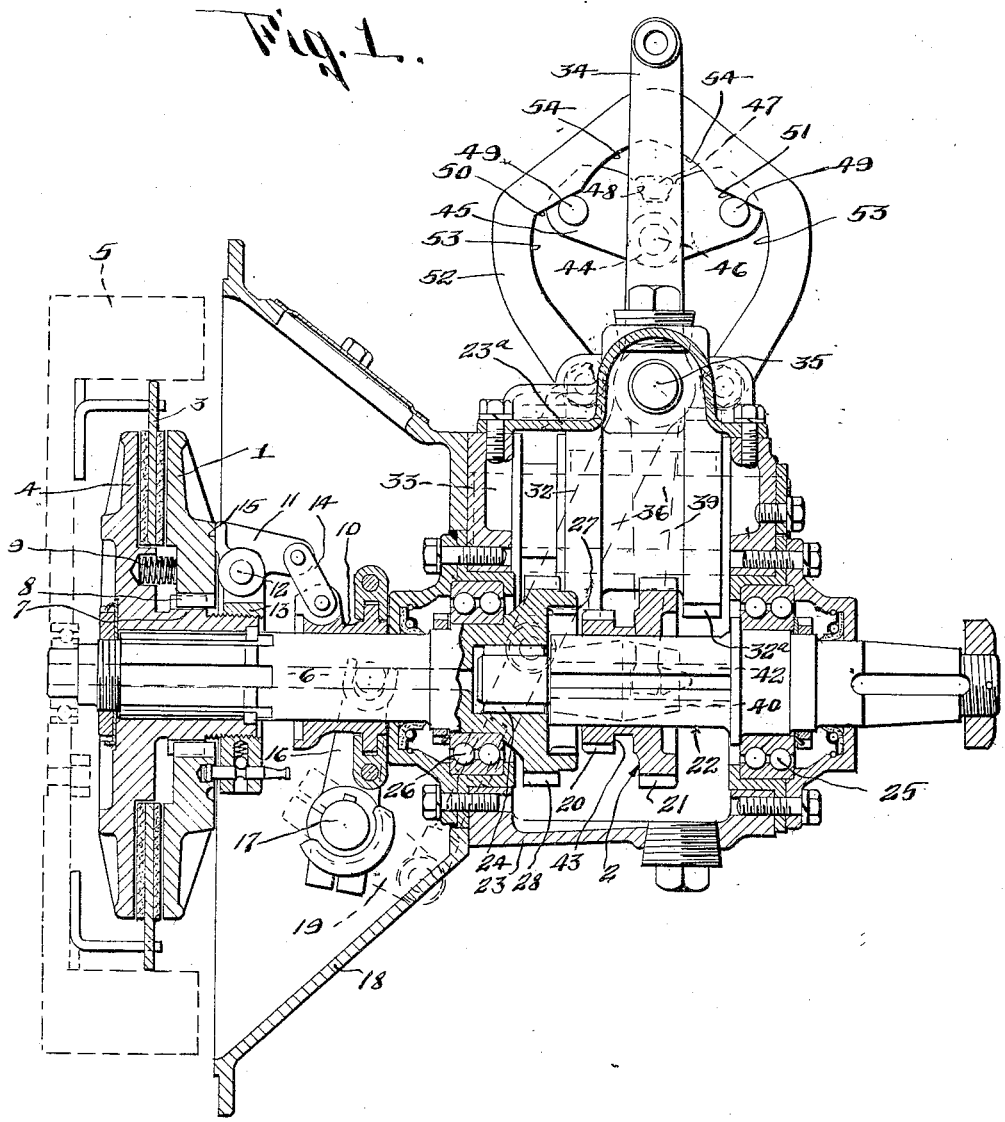
Figure 1 is a longitudinal sectional view of a transmission mechanism embodying my invention, the shifting mechanism being shown in elevation.

The transmission mechanism here shown is particularly applicable for motor boats for controlling the rotation of the propellers forwardly and rearwardly.

This invention comprises two elements to be shifted successively into engaged position and in the reverse order out of engaged position and means for shifting said elements comprising an operating part or lever connected to one element, a second operating lever connected to the other element, a coupling device carried by one lever and normally connected to or interlocked with the other lever when the levers are in starting position or neutral position and means for operating the coupling device to uncouple it when the operating lever has been moved a predetermined distance from starting position, and to operate said coupling device whereby it connects the levers when the operating lever has been moved a predetermined distance from its shifted position toward starting or neutral position.

1 and 2 designate respectively the elements to be shifted successively into engaged position, the element 1 being a clutch section shiftable axially into and out of engagement with a clutch section 3 which is interlocked with the fly wheel 5 of a motor or engine; and the element 2 being a pair of shiftable gears forming part of the reversing gearing which is actuated by the clutch, the element 2 being shiftable in opposite directions from neutral in one direction to produce forward speed and in the other direction to produce reverse speed.

The clutch element 3 is a friction disk which extends between the shiftable opposing sections 1 and 4, both sections 1 and 4 being mounted to rotate with the clutch shaft 6. The shiftable section 1 is slidably mounted on the hub 7 of the section 4 which is splined on the clutch shaft 6, the section 1 being also splined at 8 on the hub 7. The sections are pressed apart to release the clutch by one or more springs 9.

The sections 1 and 4 are shifted, in the illustrated embodiment of my invention, by a collar 10 slidable on the shaft 6, one or more of the levers 11 pivoted at 12 to lugs provided on a collar 13 on the hub 7 of the section 4 of the clutch and a link 14 connecting the collar and each lever 11. Movement of the collar 10 to the left moves the link 14 from an inclined position into and preferably beyond an upright or radial position, thus tilting the lever 11 on its pivot and pressing the section 1 against the disk 3 and pulling the section 4 against the other side of the disk 3, thus clamping the disk between the sections. When the collar 10 is moved to the right to release the sections 1, 4, the springs 9 separate the sections.

Each lever 11 is provided with a cam face thrusting against a flat face on the shiftable clutch section 1 and this cam face 15 is so shaped that the clutch sections 1, 4 are brought into clamping position on the disk 3 during the final movement of the collar 10 to the left. That is, the cam face 15 is so shaped that the clutch does not engage during the initial part of the operating movement of the shifting lever or does not engage until after the element 2 is in engaged position. The collar 10 is shifted by means of a yoke or fork 16 mounted on a rock shaft 17 journalled in the clutch housing 18, this rock shaft having an arm 19 thereon. The construction of the clutch mechanism forms no part of this invention and insofar as this invention is concerned, the clutch may be of any suitable form, size and construction.

The element 2 is double and includes a toothed clutch section or head 20 and a gear 21, this element 2 being slidably mounted on a shaft 22 mounted in a gear casing 23 in line with the shaft 6, and having a pilot bearing at 24 in one end of the shaft 6 and a bearing 25 in the rear wall of the casing 23. The shaft 6 has a similar bearing 26 in the front wall of the gear casing 23. The shaft 6 at its rear end within the casing 23 is provided with an internal clutch head 27 complemental to the clutch head 20 and also with an external gear 28 meshing with a gear 29 on a countershaft 30 mounted in the case 23, the gear 29 being coupled with another gear 31 on the shaft 30 and in mesh with the gear 32 coupled with a gear 32ª mounted on another countershaft 33 arranged to be engaged by the gear 21 when the element 2 is shifted to the right from neutral.

Shifting of the element 2 to the left from neutral, engages the clutch heads 20, 27 to produce forward speed. Shifting of the element 2 to the right, engages the gear 21 with the gear 32ª and produces reverse speed through the countershaft, as shown in Figure 4.

The means for shifting the shiftable section or sections of the clutch, that is, for operating the collar 10, comprises an operating part as a lever 34 rotatably mounted on a shaft 35 to rotate about the same and having a downwardly extending arm 36 which is connected by a link 37 to the rock arm 19 on the yoke or fork shaft 17. This lever 34 is movable in opposite directions from neutral and in order that it may shift the collar 10 always in the same direction regardless of whether the lever is moved forwardly or rearwardly, the arm 36 and link 37 are arranged in a straight line and at an angle to the arm 19 when the lever 34 is in neutral. Thus, when the lever 34 is operated, the pivotal joint 38 between the lever arm 36 and link 37 will travel in receding portions of the arc of movement of the joint 38 and will pull upwardly on the link 37 and hence rock the shaft 17 and move the collar 10 to the left when the lever 34 is moved either forwardly or rearwardly from neutral, and will also move the rock shaft 17 and collar 10 to the right when the lever 34 is returned to neutral position from either the front or rear side of neutral. The shaft 35 is mounted in the cap or cover 23ª of the casing 23 and extends transversely thereof.

The means for shifting the element 2 comprises an arm 39 on the shaft 35 coacting with a hub 40 of a fork 41 slidable along the guide rod 42 mounted in the casing 23, the fork 41 engaging in a groove 43 in the element 2. Thus, when the rock shaft 35 is rocked in one direction or the other, the fork 41 and hence the element 2 will be shifted in one direction or the other.

The rock shaft 35 is shifted by a lever 44 mounted thereon adjacent the upper arm of the lever 34 or along the side thereof and this lever 44 is operated through a coupling device between the levers 34 and 44 which normally couples said levers together when they are in starting or neutral position and which is movable automatically to uncouple the levers when the levers have been moved a predetermined distance as a unit from starting or neutral position sufficiently to engage the element 2 or the clutch 20 thereof with the clutch 27, or to engage the gear 21 with the gear 32ª, that is when the lever 34 reaches an intermediate position.

This coupling member also operates automatically in the reverse order to couple the two levers 34 and 44 together during the return movement of the lever 34 toward starting or neutral position after the lever 34 has moved far enough toward starting position or neutral position to first disengage the clutch before coupling the two levers together to shift the element 2 to starting or neutral position.

45 designates the coupling member which is double in construction and is associated with one of the levers as the lever 34. It is preferably a lever pivoted at 46 between its ends to the lever 44 coacting with a member associated with the lever 34 as a laterally extending shoulder 47 on the lever 34 extending into a notch 48 in the coupling lever 45.

The shoulder 47 and the wall of the notch or passage 48 coact with a camming action tending to tilt the coupling lever. The coupling lever also has pins or followers 49 at its opposite ends which coact with surfaces 50 and 51 formed on a stationary cam 52 secured to the cap 23ᵃ of the gear housing 23.

The surfaces 50, 51 are concentric with the axis of the lever 34 and are hence so arranged that during the initial part of the movement of the lever 34 from neutral in any direction, the lever 45 is held from tilting or from being tilted by the camming action of the shoulder 47 on the walls of the notch 48. Hence the motion of the lever 34 is transmitted to the lever 44, but when one or the other of the followers reaches the lower end of the surface 50 or 51, the lever 45 is free to be tilted by said camming action as the projection 47 passes partly out of the notch 48 along the cam surface.

During the continued movement of the lever 34, the projection slides farther out of the notch 48. During the time that the shoulder 47 is riding out of the notch, the pivotal movement of the lever 34 is actuating the lever 11 of the clutch and causing the cam face 15 of said lever 11 to engage the clutch. The lever 44 is then held stationary by reason of the engagement of one pin or follower 49 with a surface 53 and the other pin 49 with a surface 54.

The surfaces 53 and 54 are substantially concentric respectively with centers located at the ends of the arc of movement of the axis of the coupling lever 45. As the element 2 has a longer shifting movement to the right to engage the gear 21 with the gear 32 than to the left to engage the clutch heads 20 with the head 27, lever 34 has a slightly greater movement from neutral forwardly and the surfaces 53, 54 and followers 49 are correspondingly located.

The reverse of this operation takes place when the lever 44 is being shifted back to neutral to effect first the disengaging of the clutch, and second the disengaging of the element 2. The same operation takes place regardless of whether the lever 34 is moved forwardly or rearwardly from neutral.

What I claim is:

1. In an operating mechanism, the combination of an operating part and a second operating part connected respectively to elements to be shifted, a coupling normally connecting said parts whereby the parts act as a unit, the coupling comprising a member associated with the second part and shiftable relatively to said part and a member associated with the first part and interlocking with the former member to shift the same out of interlocking engagement, and means for holding the coupling member from relative shifting during the initial portion of the movement of the operating part and releasing the shiftable coupling member during the latter portion of the movement of the operating part from starting position.

2. An operating mechanism comprising an operating part and a second operating part connected respectively to elements to be shifted, a coupling member pivoted to one of said parts and the other of said parts having means for detachably interlocking with the coupling member and tending to shift the coupling member on its pivot out of interlocking position during the movement of said parts in one direction from starting position and means for holding the coupling member from pivotal movement during the initial portion of the movement of the operating part and releasing the coupling member to permit shifting thereof during the last portion of the shifting movement of the operating part, and means for locking the second part from movement after the coupling member is released.

3. An operating mechanism comprising an operating part and a second operating part connected respectively to elements to be shifted, a coupling member pivoted to one of said parts and the other of said parts having means for detachably interlocking with the coupling member and tending to shift the coupling member out of interlocking position during the movement of said part in one direction from starting position and means for holding the coupling member from shifting movement during the initial portion of the movement of the operating part and releasing the coupling member to permit shifting thereof during the last portion of the shifting movement of the operating part, and means for locking the second part from movement after the coupling member is released, the last mentioned means coacting with the coupling member.

4. An operating mechanism comprising an operating part and a second operating part connected respectively to elements to be shifted, a coupling member associated with the second part and shiftable relatively thereto and means on the operating part for detachably interlocking with the coupling member with a camming action tending to shift the coupling member out of coupled position and means located to hold the coupling member in interlocking position against said camming action during the intermediate portion of the movement of the operating part to permit the coupling member to be shifted by the camming action out of interlocking position during movement of said parts in one direction, and to permit the coupling member to be shifted by the camming action into interlocking position during an intermediate portion of the movement of the operating part back to starting position.

5. In an operating mechanism, the combination of an operating lever, a second lever, the levers being connected respectively to elements to be shifted, a coupling member associated with the second lever and shiftable relatively thereto and means on the first lever having an interlocking cam engagement with the coupling member and tending to shift the coupling member relatively to said lever out of interlocking engagement during the movement of the lever and means for holding the coupling member from relative movement out of its normal position during movement of the levers in one direction from starting position to an intermediate position of the first lever and releasing the coupling member from the holding means in an intermediate position of the first lever.

6. In an operating mechanism, the combination of an operating lever, a second lever, the levers being connected respectively to elements to be shifted, a coupling member associated with the second lever and shiftable relatively thereto and means on the first lever having an interlocking cam engagement with the coupling member relatively to the second lever and tending to shift the coupling member out of interlocking engagement during the movement of the levers and means for holding the coupling member from relative movement out of its normal position during movement of the levers in one direction from starting position to an intermediate position of the first lever and releasing the coupling member from the holding means in an intermediate position of the first lever and for effecting the reverse movement of the coupling member during the return movement of the first lever to starting position.

7. In an operating mechanism, the combination of an operating lever, a second lever, the levers being connected respectively to elements to be shifted, a coupling member associated with the second lever and shiftable relatively thereto and means on the first lever having an interlocking cam engagement with the coupling member and tending to shift the coupling member relatively to the levers out of interlocking engagement during the movement of the levers and means for holding the coupling member from relative movement out of its normal position during movement of the levers in one direction from starting position to an intermediate position of the first lever and releasing the coupling member from the holding means in an intermediate position of the first lever and for effecting the reverse movement of the coupling member during the return movement of the first lever to starting position and a stop for limiting the movement of the second lever when the coupling member is operated to uncouple said levers.

8. In an operating mechanism, the combination of an operating lever, a second lever, the levers being connected respectively to elements to be shifted, a coupling member associated with the second lever and shiftable relatively thereto and means on the first lever having an interlocking cam engagement with the coupling member and tending to shift the coupling member relatively to said levers out of interlocking engagement during the movement of the levers, means for holding the coupling member from movement out of its normal position during movement of the levers in one direction from starting position to an intermediate position of the first lever and releasing the coupling member from the holding means in an intermediate position of the first lever and for effecting the reverse movement of the coupling member during the return movement of the first lever to starting position and a stop for limiting the movement of the second lever when the coupling is operated to uncouple said levers, said stop coacting with the coupling member.

9. An operating mechanism comprising an operating lever and a second lever, the levers being connected respectively to elements to be shifted, a coupling member pivoted to the second lever and having a passage therein, a projection associated with the first lever and extending into the passage the projection and the passage having coacting cam surfaces and the coupling member having followers at opposite ends thereof, a cam having surfaces arranged substantially concentric with the axes of the levers and normally engaging the followers and an additional cam surface arranged substantially concentric with the axis of the coupling member when the second lever is at the end of its throw.

10. In an operating mechanism, the combination of an operating lever and a second lever connected respectively to elements to be shifted, said levers having movement in opposite directions from neutral position and coupling means connecting said levers together so that they act as a unit during the first portion of their movement from neutral in either direction, said coupling means comprising a movable member mounted on the second lever and a part associated with the first lever and having an interlocking cam engagement with the movable member, means for normally holding the coupling member from movement relatively to said lever during the first portions of the movements of said levers from neutral in either direction and means for holding the coupling member in its shifted position and thereby locking the second lever from movement while the first lever is moved relatively to the second lever.

11. In an operating mechanism, the combination of an operating lever and a second lever connected respectively to elements to be shifted, said levers having movement in opposite directions from neutral position, coupling means normally connecting said levers together so that they act as a unit comprising a lever pivoted between its ends to the second lever and extending to the front and rear thereof, a projection on the operating lever normally interlocked with the coupling lever and tending to move the coupling lever on its pivot to move the coupling lever out of interlocking engagement and means for holding the coupling lever from tilting movement during the first portion of the movement of the operating lever and the second lever in either direction from neutral position and permit the tilting of the coupling lever when the operating lever reaches an intermediate position, and means for locking the coupling lever in its tilted position during the latter part of the shifting movement of the operating lever in either direction from neutral, said means and said coupling lever operating in the reverse order during the return movement of the operating lever to neutral position.

12. In a transmission mechanism, the combination of a clutch including a shiftable section and a transmission gearing connected thereto to be actuated thereby including two elements, one shiftable into and out of engagement with the other and means for successively shifting the shiftable element into engagement with the other element and the shiftable clutch section into clutched position and disengaging the shiftable element and the clutch section in the reverse order including a lever connected to the clutch section, a second lever connected to the shiftable element of the gearing, a stationary member positioned adjacent said levers, connections between the levers, to couple said levers together including means shiftable with respect to both levers and cooperating with said stationary member to uncouple said connections when the clutch shifting lever has reached an intermediate position during the "in" movement of the clutch and to couple said connections when the clutch shifting lever reaches an intermediate position during the "out" movement of the clutch.

13. In a transmission mechanism, the combination of a clutch including a shiftable section and a transmission gearing connected thereto to be actuated thereby including two elements, one shiftable into and out of engagement with the other and means for successively shifting the shiftable element into engagement with the other element and the shiftable clutch section into clutched position and disengaging the shiftable element and the clutch section in the reverse order, including a lever connected to the clutch section, a second lever connected to the shiftable element of the gearing, a stationary member positioned adjacent said levers, connections between the levers and cooperating with said stationary member to couple said levers together including means shiftable with respect to both levers to uncouple said connections when the clutch shifting lever has reached an intermediate position during the "in" movement of the clutch and to couple said connections when the clutch shifting lever reaches an intermediate position during the "out" movement of the clutch and means on said stationary member coacting with said connections to lock the second shifting lever in its shifted position.

14. The combination with two elements to be shifted successively into engaged position and in the reverse order out of engaged position, of means for shifting said elements comprising an operating lever connected to one element, a second lever connected to the other element, the levers having portions arranged side by side, a coupling device normally connecting said levers and including a shiftable member carried by one of the levers and coacting with the other lever and means coacting with said shiftable coupling member to shift the same during the operation of the operating lever.

15. The combination with two elements to be shifted successively into engaged position and in the reverse order out of engaged position, means for shifting said elements comprising an operating lever connected to one element, a second lever connected to the other element, a coupling member pivoted to one lever and normally interlocked with the other lever and a cam coacting with the pivoted member to rock the same on its pivot during an intermediate portion of the movement of the operating lever from and toward starting position.

16. The combination with two elements to be shifted successively into engaged position and in the reverse order out of engaged position, one element being shiftable from starting position in one direction only and the other in opposite directions from neutral into and out of engaged positions, of means for shifting said elements including an operating lever connected to one element to shift the same into engaged position when said lever is shifted in either direction from neutral and out of engaged position when said lever is shifted back to neutral, a second lever connected to the other element to shift the same into one engaged position when moved in one direction from neutral and in another engaged position when moved in the other direction from neutral, a stationary member positioned adjacent said levers, means shiftable with respect to both levers and cooperating with said stationary member for normally coupling the levers together whereby they act as a unit during the movement of the operating lever a predetermined distance from neutral position in either direction and to uncouple said members during continued movement of the operating lever in either direction and for coupling said levers together during the return of the operating lever to neutral position when the operating lever reaches said predetermined distance from neutral position.

In testimony whereof, I have hereunto signed my name, at Syracuse, in the county of Onondaga and State of New York, this 3rd day of July, 1928.

ELMER J. BARTH.